United States Patent [19]

Morton

[11] 4,281,757
[45] Aug. 4, 1981

[54] APPARATUS FOR FEEDING ARTICLES TO PACKAGING MACHINES

[75] Inventor: David C. Morton, Harrogate, England

[73] Assignee: Baker Perkins Holdings Limited, Peterborough, England

[21] Appl. No.: 65,152

[22] Filed: Aug. 9, 1979

[30] Foreign Application Priority Data

Sep. 6, 1978 [GB] United Kingdom ............... 35836/78

[51] Int. Cl.³ ............................................. B65G 47/51
[52] U.S. Cl. ..................................... 198/358; 198/369; 198/812
[58] Field of Search ............... 198/444, 445, 456, 369, 198/367, 585, 424, 431, 812, 601, 446, 356, 8; 53/147, 202

[56] References Cited

U.S. PATENT DOCUMENTS

| 3,874,494 | 4/1975 | Temming | 198/446 |
| 4,164,277 | 8/1979 | Fluck et al. | 198/369 X |

Primary Examiner—Robert B. Reeves
Assistant Examiner—Douglas D. Watts
Attorney, Agent, or Firm—Watson, Cole, Grindle & Watson

[57] ABSTRACT

Apparatus for feeding a number of wrapping machines with chocolate bars or the like, produced continuously and advancing end-on in a procession in more or less regular files and rows comprising a series of successive modules which feed the individual wrapping machines. The modules are preceded by a separator which channels the procession into separate lanes. The modules form part of a conveyor system which advances the articles continuously along a horizontal path. The modules operate in succession to lift the articles in the associated lane from the horizontal path and deliver them to an intermittently travelling cross conveyor leading to one of the wrapping machines. When any packaging machine is unable to accept articles, the articles lifted by its module are returned to the horizontal feed path and the cross conveyor of that module is stopped.

6 Claims, 11 Drawing Figures

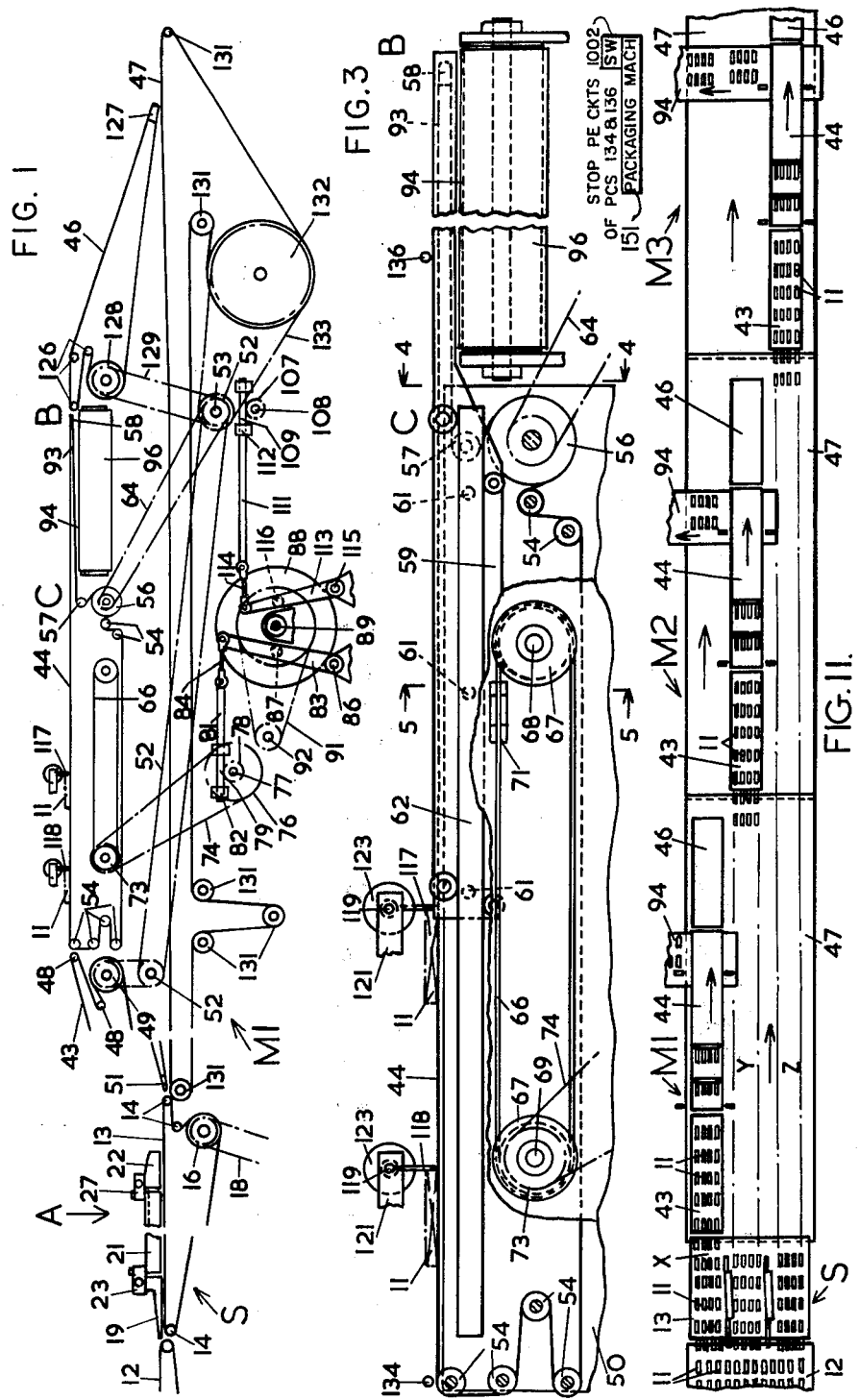

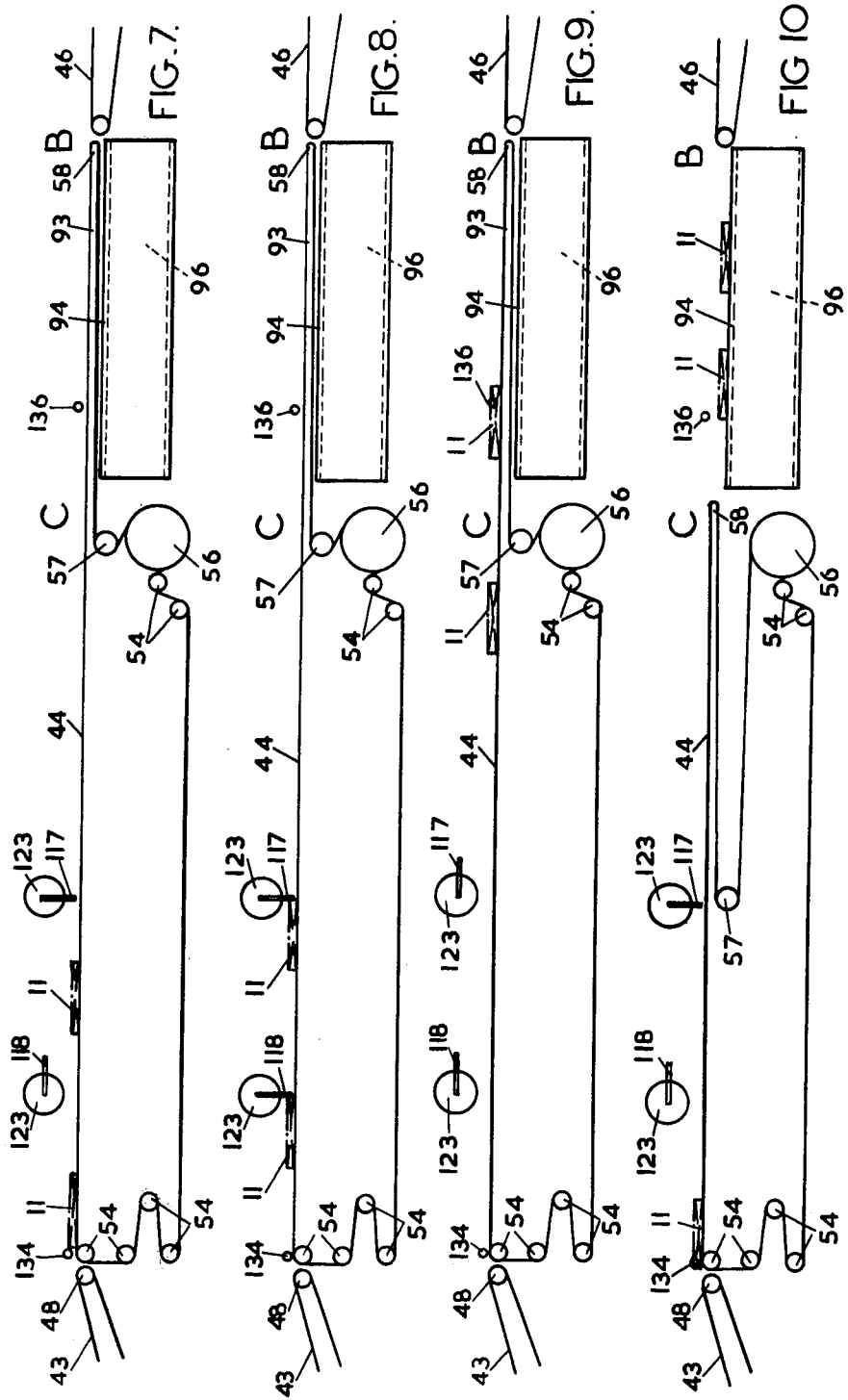

APPARATUS FOR FEEDING ARTICLES TO PACKAGING MACHINES

BACKGROUND

Bar shaped articles of foodstuff, such for example as chocolate bars, chocolate coated wafers, and biscuits are produced by modern producing machinery at a rate higher than that at which they can be packaged by a single packaging machine, notwithstanding that the packaging machine operates continuously.

The articles are normally delivered from the producing machine as a procession, in which they are disposed in end-on orientation in files and rows, and it is accordingly necessary to make provision for systematic feeding of the articles in the procession to a plurality of separate packaging machines. It is known to arrest momentarily individual rows of articles and direct them to specific packaging machine infeeds, usually at right angles to the product flow, and in a typical plant four or five packaging machines may be systematically fed from the production line. However, the time of demand for product from each packaging machine will not always synchronise with the frequency of rows on the main supply conveyor, but for intermittent packaging machines this does not cause a problem.

When, in the interests of speed of production, continuous motion packaging machines are used it is necessary for the supply of articles to the machines to be continuous, the rate to be reasonably constant, and to provide an immediate and convenient by-pass system to allow for inevitable stoppages of the packaging machines. It is an object of the present invention to feed continuously a number of packaging machines so that the rate of supply to any individual machine, being derived from a predetermined and fixed share of the procession of articles delivered from the producing machine, will be reasonably constant and unaffected by the requirements of the others.

SUMMARY OF THE INVENTION

The invention accordingly provides apparatus for feeding articles to a plurality of packaging machines from a procession of bar shaped articles of foodstuff disposed in end-on orientation in files and rows on an output conveyor from a producing machine, said apparatus comprising a continuously moving conveyor system providing a feed path for the procession aligned with the output conveyor and a plurality of feed modules, which are spaced in succession along the feed path and have intakes offset laterally with respect to one another to enable each of the feed modules to accept a different lane of articles in the procession, each feed module being operative to feed all articles in the associated lane to an individual packaging machine and comprising a cross conveyor extending transversely to the feed path and leading to the packaging machine, means for diverting the articles in the lane from the procession on the feed path and normally operative to deliver successive batches of diverted articles to the cross conveyor so that they are advanced broadside-on by the cross conveyor to the associated packaging machine, and means operative upon stoppage of the packaging machine supplied by the cross conveyor to return diverted articles to the feed path.

Preferably each feed module comprises a continuously moving upwardly inclined pick-up conveyor for lifting articles in the associated lane from the feed path, a continuously moving transfer band conveyor having at its delivery end a nose portion which extends over the cross conveyor, means operative only when the packaging machine is in operation for periodically retracting said nose portion to allow articles to fall from the transfer conveyor onto the cross conveyor, and a continuously moving downwardly inclined by-pass conveyor for returning articles from the delivery end of the transfer conveyor to the feed path.

So long as any packaging machine is operative, therefore, the transfer conveyor of the associated feed module is effective to transfer articles to the cross conveyor feeding the packaging machine. When, however, the packaging machine is stopped for any reason and unable to accept articles, reciprocation of the transfer conveyor ceases and the articles diverted by the module are returned to the feed path by the by-pass conveyor.

In a preferred embodiment the apparatus includes, in advance of the first feed module, a separator for separating the procession of articles into defined lanes to facilitate diversion of the articles in the respective lanes by the associated feed modules.

BRIEF DESCRIPTION OF THE DRAWINGS

An embodiment of the invention will now be described in detail, by way of example, with reference to the accompanying drawings in which:

FIG. 1 is a diagram, showing in elevation the first module of apparatus for receiving articles from a producing machine and transferring them to a cross conveyor leading to a wrapping machine, FIG. 3 is an elevation, partly in section and on a larger scale, of part of the apparatus shown in FIG. 1, FIG. 11 is a diagrammatic plan view showing all the feed modules of the apparatus.

DETAILED DESCRIPTION

As shown in FIG. 11, foodstuff articles 11 of bar shape are delivered continuously from a producing machine (not shown), e.g. an enrober for coating wafer biscuits, on a band conveyor 12 in end-on orientation in more or less regularly spaced files and rows, to a separator S, which as later described, separates the flow of articles into three lanes, X, Y, Z, each consisting of four articles. The articles then pass to successive identical feed modules, $M_1$, $M_2$, $M_3$. Each feed module feeds the articles in one lane into a procession on a cross conveyor 94, which carries the articles disposed side by side in pairs and broadside on to an individual continuously operating wrapping machine. As explained later, in the event of any of the wrapping machines becoming inoperative, its associated feed module is disabled and the articles in the lane concerned continue to travel forwards in their original direction and orientation and are not transferred to the associated cross conveyor 94.

Figure 2:
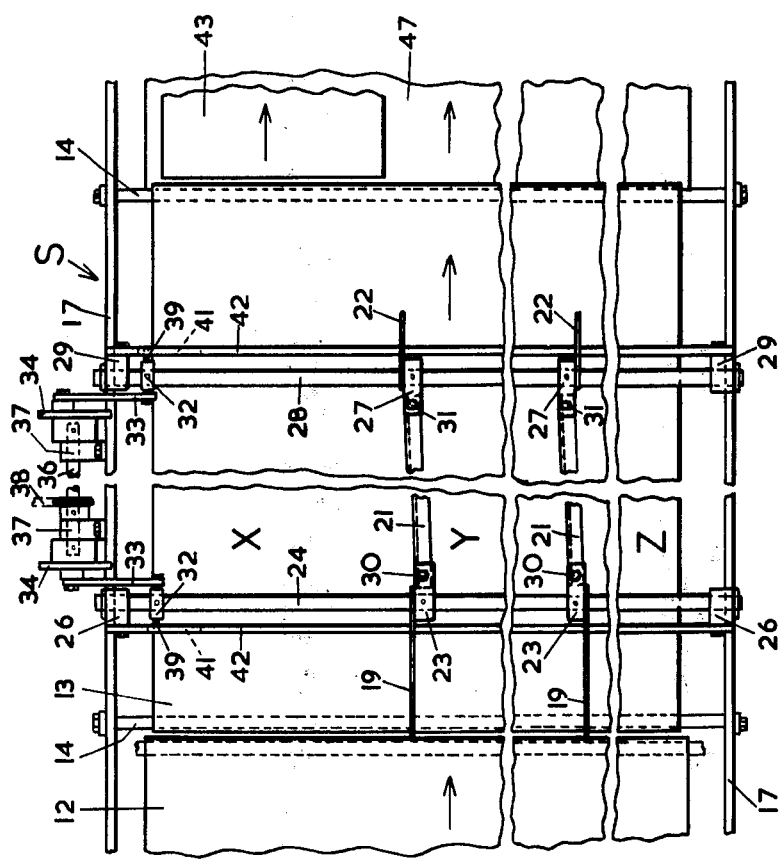
FIG. 2 is a plan view of part of the apparatus indicated by the arrow A in FIG. 1.

As best shown in FIGS. 1 and 2, the separator S comprises a continuously operated conveyor 13, which is of the same width as the conveyor 12 and the upper run of which is disposed at a level just below that of the upper run of the conveyor 12. The conveyor 13 receives the articles from the conveyor 12 and extends over a series of freely rotatable rollers 14 and a driven roller 16, all mounted in a framework 17, the roller 16 being driven by chain and sprocket gearing 18 from a motor (not shown).

The division of the articles 11 into three lanes X, Y, Z is effected by two sets of oscillating vanes 19, 21 and 22 mounted above the conveyor 13 with the bases of the vanes disposed just above the upper surface of the conveyor 13, and the top surfaces of the vanes disposed just below the top surface of the conveyor 12.

Each vane 19 is mounted on a block 23 secured to a shaft 24 slidably mounted in bearings 26 in the framework 17. The vanes 22 are mounted on blocks 27 secured to a shaft 28 slidably mounted in bearings 29 in the framework 17 and the vanes 21, which are of angle section, are pivotally connected to the blocks 23 and 27 at 30 and 31 respectively. Secured to one end of each shaft 24 and 28 is a collar 32 to which is attached one end of an arm 33, the other end of which is eccentrically mounted on a disc 34 secured to a shaft 36 rotatably mounted in bearings 37 secured to the framework 17, the shaft 36 being continuously driven by chain and sprocket gearing 38 from a motor (not shown). The eccentric mountings of the arms 33 are so arranged as to impart a small degree of oscillation through the shaft 24 to the vanes 19 and a somewhat greater oscillation through the shaft 28 to the vanes 22. The shafts 24 and 28 are prevented from rotation during their oscillating movement by the provision of pegs 39 on the collars 32 which extend into slots 41 formed in plates 42 secured to the framework 17.

It will be seen, therefore, that if the leading edge of an article 11 in a row passing from the conveyor 12 on to the conveyor 13 should come into contact with the top surface of a vane 19 it will be diverted to one side or the other of the vane 19 and, as the article 11 continues its travel along the conveyor 13 the vanes 21 and 22 will impinge on the side of the article to increase further the gap between adjacent lanes.

Each feed module comprises an upwardly inclined pick-up conveyor 43, a transfer conveyor 44, a downwardly inclined by-pass conveyor 46 and an underpass conveyor 47. The conveyor 43 extends over a pair of freely mounted rollers 48, a driving roller 49 and a nosepiece 51 all mounted in a framework 50 (FIG. 3), and is continuously driven at the same rate as the conveyor 13 by chain and sprocket gearing 52 from a shaft 53 driven by a motor (not shown). In the first module the conveyor 43 receives rows of articles 11 from the lane X in preparation for their transfer to the first wrapping machine, whilst the rows of articles 11 in the lanes Y and Z pass on to the underpass conveyor 47 which transports them to the second module as shown in FIG. 11.

The conveyor 43 feeds the rows of articles on to the transfer conveyor 44 which extends over freely mounted rollers 54 and a driving roller 56, all mounted in the framework 50, and over a freely rotatable roller 57 and a nosepiece 58 both mounted in a carriage 60 (FIGS. 4 and 5) comprising side frames 59 secured together by lateral struts 61. The carriage 60 is mounted for reciprocating movement on a pair of tracks 62, secured to the framework 50, which are engaged by pairs of rollers 63 rotatably mounted on the carriage 60. The conveyor 44 is driven continuously at a higher rate than the conveyor 43, so that as the rows of articles 11 pass on to the conveyor 44 the pitch between the rows is increased, by chain and sprocket gearing 64 from the shaft 53.

Figure 5:
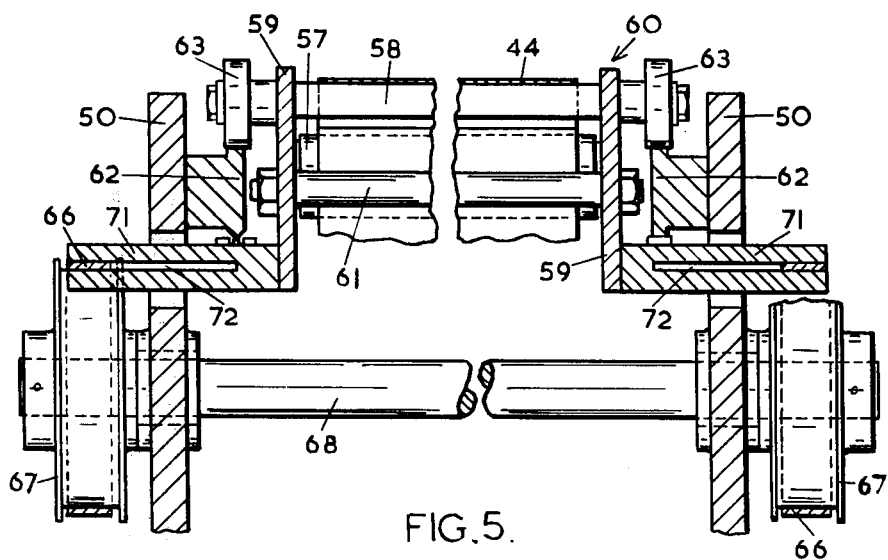
FIG. 5 is a section on the line 5—5 in FIG. 3.

The carriage 60 is reciprocated at intervals by a pair of toothed belts 66, FIGS. 1, 3 and 5, extending around a pair of pulleys 67 secured to shafts 68 and 69 rotatably mounted in the framework 50. The carriage 60 is secured to the belts 66 by plates 71 secured to the side frame 59 and each having a slot 72 through which extends a portion of one of the belts 66. Secured to one end of the shaft 69 is a sprocket 73 connected by a chain 74 to a sprocket 76 secured to a shaft 77 which carries a pinion 78 engaging a rack 79 formed on a bar 81 slidably mounted in bearings 82. The bar 81 is connected by a link 84 to an arm 83 pivotally mounted on a shaft 86 and carrying a roller 87 which runs in a cam track formed in a disc 88 secured to a shaft 89 driven at intervals by chain and sprocket gearing 91 from the output shaft 92 of a well known type of one revolution clutch and brake unit (not shown). The shape of the cam track in the disc 88 is such that the arm 83 will firstly be moved to cause the rack 79 to rotate the shaft 77 in an anticlockwise direction and then, on the return stroke of the arm 83, to rotate the shaft 77 in a clockwise direction, this movement being transmitted to the toothed belts 66 by the sprockets 76, 73 and the chain 74 to cause the carriage 60 firstly to move a cantilevered portion 93 of the conveyor 44 from position B to position C and then return it to its original position for a purpose to be described later. During this reciprocating movement the conveyor 44 will remain tensioned, because when the nosepiece 58 of the conveyor 44 is retracted from B to C the roller 57 is retracted by the same amount.

Figure 6:
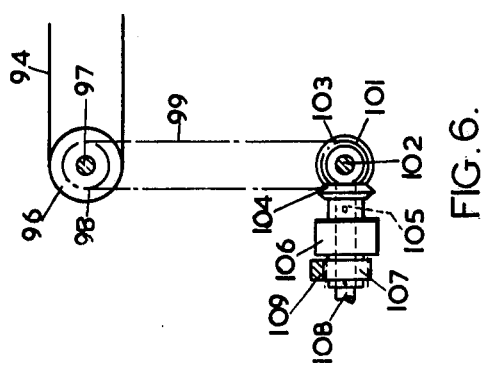
FIG. 6 is a detail view showing part of the apparatus shown in FIG. 1, FIGS. 7, 8, 9 and 10 are diagrams illustrating the operation of the apparatus.

When the cantilevered portion 93 of the conveyor 44 is in the position shown in FIG. 1, it extends over the cross conveyor 94, which is mounted on rollers 96 (one only of which is shown). Each roller 96 is secured to a shaft 97 (FIG. 6) rotatably mounted in the framework 50. The conveyor 94 is driven intermittently in timed relationship with the reciprocating movement of the carriage 60. A sprocket 98 secured to one of the shafts 97 is connected by a chain 99 to a sprocket 101 secured to a shaft 102, carrying a bevel gear 103 in mesh with a bevel gear 104 secured to the output shaft 105 of a one-directional clutch unit 106. A pinion 107 secured to the input shaft 108 of the clutch unit 106 meshes with a rack 109 formed on a bar 111 slidably mounted in bearings 112 (FIG. 1). The bar 111 is connected by a link 114 to an arm 113 pivotally mounted on a shaft 115 and carrying a roller 116 which runs in a cam track formed in a disc (not shown) secured to the shaft 89. The shape of the cam track is such that on the forward stroke of the arm 113 the rack rotates the shaft 108 in a clockwise direction to drive the conveyor 94 through the clutch unit 106, the bevel gears 104 and 103 and the chain and sprocket gearing 101, 99 and 98. On the return stroke of the arm 113 the clutch unit 106 free-wheels and its output shaft 105 therefore makes no movement.

Figure 4:
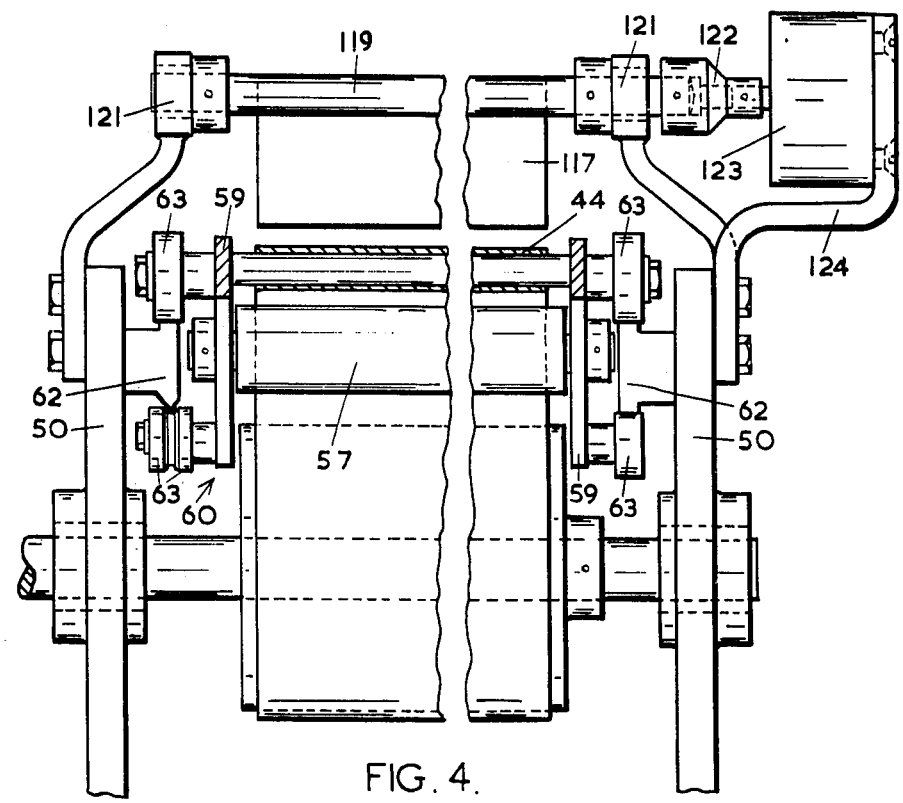
FIG. 4 is a section on the line 4—4 in FIG. 3.

In the apparatus illustrated two rows of articles 11 are transferred from the conveyor 44 to the conveyor 94 in one cycle of operation and these two rows are correctly aligned and placed at the required pitch by a pair of gates 117 and 118 which are disposed above the conveyor 44 and extend across its full width. Each gate is secured to a shaft 119 rotatably mounted in brackets 121 secured to the framework 50. As shown in FIG. 4, each shaft 119 is connected by a coupling 122 to a well known type of rotary solenoid 123 attached to a bracket 124 secured to the framework 50. As will be explained later the gates 117 and 118 are moved by operation of the solenoids 123 into and out of the path of movement of the rows of articles 11 travelling along the conveyor 44.

The receiving end of the by-pass conveyor 46 is disposed adjacent the cantilevered portion 93 of the conveyor 44. The conveyor 46 extends downwardly towards the underpass conveyor 47 over freely mounted rollers 126, a nosepiece 127, and a driving roller 128, all mounted in the framework 50, and is continuously driven by chain and sprocket gearing 129 from the shaft 53.

The underpass conveyor 47 extends over a series of freely mounted rollers 131 and a driving roller 132, all mounted in the framework 50, and is driven continuously by chain and sprocket gearing 133 from the shaft 53.

The second module $M_2$ is arranged adjacent the end of the module $M_1$ as shown in FIG. 11, with its pick-up conveyor 43 positioned to receive the rows of articles 11 from the lane Y whilst the row of articles 11 in the lane Z pass on to the underpass conveyor 47 of the second module. The third module $M_3$ is arranged adjacent the end of the second module $M_2$, with its pick-up conveyor 43 positioned to receive the rows of articles from the lane Z.

Each of the cross conveyors 94 delivers the articles carried by it to a continuously moving infeed flight conveyor of its individual wrapping machine and operates in the manner described in British Pat. No. 1443079, an intermediate conveyor (not shown) being disposed between this infeed conveyor and the delivery end of the conveyor 94.

The operation of the module $M_1$ will now be described with particular reference to FIGS. 7, 8, 9 and 10. As a row of articles 11 passes from the pick-up conveyor 43 on to the transfer conveyor 44 it is accelerated away from the following row of articles, due to the higher speed of the conveyor 44, and at the same time "breaks" the beam of a photoelectric cell 134 which actuates a first timing switch (not shown) of known construction to activate the rotary solenoid 123 controlling the gate 117 to cause this gate to move into the path of movement of this row of articles as shown in FIG. 7 to arrest and align the individual articles 11 in the row laterally. As the following row of articles 11 passes from the conveyor 43 on to the transfer conveyor 44 it also "breaks" the beam of the photoelectric cell 134 which actuates a further timing switch (not shown) to activate the rotary solenoid 123 controlling the gate 118 to cause it to move into the path of movement of the second row of articles to arrest it and similarly align the articles 11 laterally in that row as shown in FIG. 8. After an interval determined by the timing switches the two "gated" rows are released simultaneously by withdrawal of the gates 117, 118 by the solenoids 123 to allow the two rows of articles to continue their travel along the conveyor 44. As the leading row approaches the cantilevered portion 93 of the conveyor 44 it "breaks" the beam of a further photoelectric cell 136 (FIG. 9) which activates the clutch and brake unit controlling rotation of the shaft 89 to initiate a cycle of operation.

The carriage 60 is accordingly caused by the cam disc 88 to retract the cantilevered portion 93 of the conveyor 44 from position B to position C to cause the two rows of articles 11 to be discharged from the end of the conveyor 44 onto the conveyor 94 (FIG. 10). While the conveyor 44 is in its retracted position C the conveyor 94 is advanced by its cam disc on the shaft 89 to transport the two rows towards the wrapping machine and into position clear of the path of movement of the conveyor 44 in readiness for that conveyor to be returned to position B to complete the cycle of operation. While this cycle is taking place a further two rows of articles 11 pass from the pick-up conveyor 43 on to the conveyor 44, their travel being arrested as before by actuation of the gates 117 and 118. Upon their release the photoelectric cell 136 is again actuated to initiate another cycle of operation of the carriage 60 and impart a further step of movement to the conveyor 94.

Accordingly, so long as the producing machine continues to supply rows of articles 11 a continuous supply of articles will be fed to each wrapping machine by its associated module. Should a gap occur in the rows of articles on the pick-up conveyor 43 of any module, after a row has already passed onto the conveyor 44 and been engaged by the gate 117, the switch controlling its operation maintains that gate in the row-arresting position until such time as a further row passes the photoelectric cell 134 to actuate the gate 118. After that row has engaged the gate 118 both gates are then released as before to allow the rows to travel towards the photoelectric cell 136 to set in motion the cycle mentioned above, thus ensuring that two rows of articles 11 are always transferred to the conveyor 94.

When the gate 117 remains in its arresting position, the conveyor 94 will cease to advance. This is ultimately sensed by a detector associated with the aforementioned intermediate conveyor, which slowes or stops the wrapping machine 151 and the intermediate conveyor.

When the wrapping machine is stopped, the feed of articles thereto must be arrested. To this end a switch on the wrapping machine is operated which overrides the circuits of the photoelectric cells 134 and 136. This action cuts out the operation of the gates 117 and 118 (i.e. they remain in the position clear of the path of movement of the articles) and therefore the retracting movement of the conveyor 44. The rows of articles 11 then travel from the pick-up conveyor 43, along the transfer conveyor 44 and then on to the by-pass conveyor 46, which in turn forwards the articles to the underpass conveyor 47. These articles, in the case of interruption of the normal action of any of the modules, will be discharged from the end of the underpass conveyor of the last module, whence they may be transferred manually or automatically to a stand-by wrapping machine.

In the embodiment described, each row of articles in each lane consists of four articles 11. It is, however, also possible to subdivide the articles by the separator S into lanes consisting of a single file of articles or rows of articles containing in each row a number of articles other than four. Also, while the gating system has been described as depositing two rows of articles from the conveyor 44 onto the conveyor 98 at each retraction of the nose of the conveyor 44 it may be so modified as to deposite a single row of articles or more than two rows of articles at each retraction of the nose.

With the apparatus described, very high output rates are possible because at no time are the articles subject to handling speeds above the basic forming rate for the processing plant, and when finally rowed-up on the intermediate conveyor prior to transfer to each wrapping machine, the speed of each intermediate conveyor is determined by the width of the articles and not their length. However, the final wrapping speed will be high, and for gentle transfer of the articles from the feeder module to the high speed flight conveyor of the wrapping machine, use is made of the system described in British Pat. No. 1443079 which provides widely pitched flights on auxiliary conveyors alongside the wrapping machine infeed with subsequent gentle sideways transfer to the infeed.

What I claim as my invention and desire to secure by Letters Patent is:

1. Apparatus for feeding a plurality of packaging machines with a procession of articles disposed in end-on orientation in rows on an output conveyor from a producing machine, comprising:

a continuously moving conveyor providing a feed path for said articles and aligned with said output conveyor;

a plurality of feed modules spaced in succession along the feed path and including intakes offset laterally with respect to one another to enable each of the feed modules to accept a different row of articles of a cross conveyor associated with each feed module and operative to feed the articles in the associated row to an individual packaging machine in a direction transverse to the feed path;

each feed module including a continuously moving inclined pick-up conveyor for lifting articles in the associated row from the feed path, a continuously moving transfer conveyor including at its delivery end a nose portion extending over the associated cross conveyor, means operative only when the associated packaging machine is in operation for periodically retracting said nose portion to allow articles to fall from said transfer conveyor onto said cross conveyor, and a continuously moving inclined by-pass conveyor for returning articles from the delivery end of said transfer conveyor to the feed path in the event of non-retraction of said nose portion.

2. Apparatus according to claim 1, wherein the nose portion of the transfer conveyor is mounted on a carriage reciprocable along the feed path and including a cam shaft operable to reciprocate the carriage, mechanism operable by the cam shaft to advance the cross conveyor, and a sensor for sensing the articles on said nose portion and operable to cause rotation of the cam shaft intermittently and in steps in response to accumulation of a predetermined number of articles on said nose portion.

3. Apparatus according to claim 2, which includes means responsive to stoppage of the packaging machine for rendering the sensor ineffective to cause rotation of the cam shaft and thereby stopping reciprocation of said nose portion.

4. Apparatus according to claim 2, which includes at least two gates disposed in succession above the transfer conveyor, a further sensor which is operative in response to arrival of articles on the transfer conveyor to cause the gates to arrest the articles temporarily and thereby ensure a constant pitch between successive articles on the nose portion and, when there is more than one file of articles, to align the articles in rows, and means for rendering the gate ineffective on stoppage of the packaging machine.

5. Apparatus according to claim 1 further comprising a separator ahead of said first feed module for separating the procession of articles into defined rows.

6. Apparatus according to claim 5, wherein the separator includes vanes which depend between the articles travelling along the feed path and means for oscillating the vanes in a direction transverse to the feed path.

* * * * *